US007397528B2

(12) United States Patent
Okumura

(10) Patent No.: US 7,397,528 B2
(45) Date of Patent: Jul. 8, 2008

(54) LIQUID CRYSTAL DISPLAY DEVICE AND ELECTRONIC APPARATUS

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 10/898,332

(22) Filed: Jul. 26, 2004

(65) Prior Publication Data

US 2005/0052605 A1    Mar. 10, 2005

(30) Foreign Application Priority Data

Aug. 18, 2003    (JP)    .............................. 2003-294685

(51) Int. Cl.
    *G02F 1/1343*    (2006.01)
    *G02F 1/1335*    (2006.01)
(52) U.S. Cl. ........................ 349/146; 349/144; 349/145; 349/114
(58) Field of Classification Search ................. 349/114, 349/144–146
    See application file for complete search history.

(56) References Cited

U.S. PATENT DOCUMENTS

| 4,955,698 | A | 9/1990 | Knoll et al. |
| 5,535,028 | A | 7/1996 | Bae et al. |
| 6,650,391 | B2 * | 11/2003 | Chang et al. ................. 349/144 |
| 6,788,357 | B2 | 9/2004 | Moon |
| 6,862,058 | B2 * | 3/2005 | Ikeno et al. .................. 349/114 |
| 6,924,856 | B2 * | 8/2005 | Okumura et al. .............. 349/96 |
| 7,015,996 | B2 * | 3/2006 | Sakamoto et al. ........... 349/113 |
| 2002/0075436 | A1 | 6/2002 | Kubo et al. |
| 2002/0080320 | A1 | 6/2002 | Suzuki et al. |
| 2002/0191128 | A1 | 12/2002 | Okumura et al. |
| 2003/0151574 | A1 | 8/2003 | Chang et al. |
| 2004/0051826 | A1 * | 3/2004 | Lee ............................ 349/113 |
| 2005/0030453 | A1 * | 2/2005 | Maeda ........................ 349/114 |
| 2006/0007384 | A1 * | 1/2006 | Kurasawa .................... 349/155 |

FOREIGN PATENT DOCUMENTS

| CN | 1359025 A | 7/2002 |
| CN | A 1504796 | 6/2004 |
| JP | A-63-142330 | 6/1988 |

(Continued)

OTHER PUBLICATIONS

Makoto Jisaki et al. "Development of transflective LCD for high contrast and wide viewing angle by using homeotropic alignment"; Asia Display/IDW'01; 2001; pp. 133-136.

*Primary Examiner*—Julie-Huyen L. Ngo
(74) *Attorney, Agent, or Firm*—Oliff & Berridge, PLC

(57) ABSTRACT

Aspects of the invention can provide a fast-response, homeotropic-mode, liquid crystal display device performing bright and high-quality display having a feature of wide-viewing angle. The liquid crystal display device includes a pair of substrates, each having electrodes on one surface thereof, a liquid crystal layer sandwiched between the pair of substrates, having the electrodes interposed therebetween, and a display area having a plurality of dot areas two-dimensionally arrayed therein. The liquid crystal layer can include liquid crystal vertically aligned in an initial state. In a single dot area, each pixel electrode has a plurality of island-shaped portions and connecting portions electrically connecting adjacent two of the island-shaped portions to each other, and the pluralities of island-shaped portions are arrayed in a stagger pattern in plan view.

8 Claims, 10 Drawing Sheets

FOREIGN PATENT DOCUMENTS

| | | |
|---|---|---|
| JP | U 2-33031 | 3/1990 |
| JP | A 02-007021 | 1/1991 |
| JP | A 04-285917 | 10/1992 |
| JP | A 09-230303 | 9/1997 |
| JP | A-2001-194681 | 7/2001 |
| JP | A 2002-202511 | 7/2002 |
| JP | A 2002-287158 | 10/2002 |
| JP | A-2002-372713 | 12/2002 |
| JP | A 2003-43525 | 2/2003 |
| JP | A-2003-043525 | 2/2003 |
| JP | A 2003-140169 | 5/2003 |
| JP | A 2004-177788 | 6/2004 |
| KR | 1997-4883 | 11/1993 |
| KR | 2002-015009 A | 2/2002 |
| KR | 0507585 B | 10/2002 |
| KR | 2002-0079583 | 8/2005 |

* cited by examiner

LIQUID CRYSTAL DISPLAY DEVICE AND ELECTRONIC APPARATUS

BACKGROUND OF THE INVENTION

1. Field of Invention

The invention relates to a liquid crystal display device and an electronic apparatus.

2. Description of Related Art

Related liquid crystal display devices can be used as image displays for electronic apparatus, such as a computer, a portable phone, or the like, and generally has a structure in which a liquid crystal layer composed of twisted nematic (TN) liquid or the like is sandwiched between a pair of substrates. Since such type of liquid crystal display device has a problem of a narrow viewing-angle, a homeotropic-mode liquid crystal display device having a feature of wide-viewing angle has been recently more commonly used. Regarding to a homeotropic-mode, liquid crystal display device, since it is required to properly control a direction toward which liquid crystal molecules are inclined at the time of having a voltage applied thereon, a variety of controlling devices have been proposed. For example, Japanese Unexamined Patent Application Publication No. 2003-43525 discloses liquid crystal display device having a structure in which an electrode in a single dot area serving as a minimum unit of display is divided into a plurality of island-shaped portions, and these island-shaped portions are arrayed in a matrix-shaped, square-grid or rectangular-grid pattern of m rows and n columns. With this structure, an alignment control of uniform and stable homeotropic liquid crystal can be performed. This related art is presently employed in a liquid crystal TV set or the like for forming a dot area having a matrix-shaped grid pattern of 11 rows and 4 columns or 8 rows and 3 columns in which the island-shaped portions are arrayed.

SUMMARY OF THE INVENTION

The related art described above can also be applicable to a higher-definition display device (that is, a display device in which a dot pitch is smaller) achieved by reducing the number of island-shaped portions disposed in the dot area. However, attempts at applying the art to a high-definition display device reveals that mere reduction of the number of the island-shaped portions so as make the size of the dot area smaller causes a problem of dark display or a reduced response speed.

An object of the invention can be to provide a homeotropic-mode liquid crystal display device performing bright and high-quality display having features of wide-viewing angle and also fast response. The liquid crystal display device according to a first aspect of the invention includes a pair of substrates, each having electrodes disposed on one surface thereof, a liquid crystal layer sandwiched between the pair of substrates, having the electrodes interposed therebetween, and a display area having a plurality of dot areas two-dimensionally arrayed therein. The liquid layer can include liquid crystal vertically aligned in an initial state. Also, in a single dot area, each of the electrodes disposed on the one surface of at least one of the pair of substrates can include a plurality of island-shaped portions and at least one connecting portion electrically connecting adjacent two of the island-shaped portions to each other. In addition, the plurality of island-shaped portions can be arrayed in the display area substantially in a honeycomb pattern in plan view.

In the exemplary liquid crystal display device including the electrodes, each including the plurality of island-shaped portions arrayed in a single dot area, due to an oblique electric field generated in the edge of each island-shaped portion during application of a voltage, homeotropic liquid crystal is aligned toward the center of each of the island-shaped portions, thereby achieving display having a viewing-angle characteristic which is uniform in all directions. Unfortunately, with the liquid crystal display device having such a structure, its display characteristic depends on the size of each island-shaped portion, and that, when the size lies out of its optimal range, its response speed, and transmittance (reflectance) are reduced, and its display quality is deteriorated, as described in greater detail below.

Also, in the related liquid crystal display device in which a plurality of island-shaped portions are arrayed in a square grid pattern in a single dot area, since the size of each island-shaped portion is determined in accordance with the size of the dot area and the number of the island-shaped portions arrayed in the dot area, the versatility of possible design feature of the size of the island-shaped portion is reduced. Hence, depending on the size of the dot area, an excessively large-or small size of the island-shaped portion may cause a problem of slow response or reduced transmittance, respectively. Also, when the island-shaped portions are arrayed in a square grid pattern, the closer the shape of the island-shaped portion comes to a round so as to achieve an excellent alignment control, a non-display area formed between two of the island-shaped portions becomes wider, thus causing a problem of smaller aperture ratio and dark display.

In view of the above-described problems, in the liquid crystal display device according to the invention, the island-shaped portions are arrayed substantially in a stagger pattern in plan view. By disposing the island-shaped portions as described above, the two-dimensional filling factor of the island-shaped portions in the display area is increased, and the versatility of possible design feature of the size of the island-shaped portion is further increased compared to the liquid crystal display device in which the island-shaped portions are arrayed in a square grid pattern. With this structure, an area ratio of the island-shaped portions in the display area is increased, thereby leading to bright display. Also, island-shaped portions having sizes so as to achieve bright display having an excellent feature of fast response can be disposed in a dot area regardless of the size of the dot area.

Also, another liquid crystal display device according to a second aspect of the invention can include a pair of substrates, each having electrodes disposed on one surface thereof, a liquid crystal layer sandwiched between the pair of substrates, having the electrodes interposed therebetween, and a display area having a plurality of dot areas two-dimensionally arrayed therein. The liquid layer includes liquid crystal vertically aligned in an initial state. Also, in a single dot, each of the electrodes disposed on the one surface of at least one of the pair of substrates includes a plurality of island-shaped portions and at least one connecting portion electrically connecting adjacent two of the island-shaped portions to each other. In addition, the island-shaped portions are linearly arrayed in the display area in a pattern formed by a plurality of straight lines juxtaposed to one another. Furthermore, two of the island-shaped portions adjacent to each other in a direction along which the straight lines are juxtaposed to one another are displaced with respect to each other in a direction along which the straight lines extend.

With the above-described structure, the filling factor of the island-shaped portions is increased, and resultantly, an increased aperture ratio of each dot area leads to bright display. Also, since the island-shaped portions linearly arrayed as described above are alternately displaced, the size of each island-shaped portion can be changed with great versatility of possible design feature, whereby the island-shaped portions can be formed so as to have sizes for achieving an appropriate transmittance and response speed regardless of the size of each dot area.

In the liquid crystal display device according to the present invention, the island-shaped portions are linearly arrayed in the single dot area, and the other dot area adjacent to foregoing single dot area in a direction perpendicular to the linear array direction of the island-shaped portions is displaced relative to the foregoing single dot area in the array direction of the island-shaped portions. With this structure, the island-shaped portions can be linearly arrayed in the dot areas so as to form the dot areas having an approximately rectangular shape, and also two of the island-shaped portions adjacent to each other are displaced with respect to each other, thereby achieving the same advantages as described above. Such a structure is suitable for a relatively-high-definition liquid crystal display device in which defective display due to displacement of the dot areas is unlikely visually identified.

In the exemplary liquid crystal display device according to the invention, the island-shaped portions are nonlinearly arrayed in the single dot area and also linearly arrayed so as to extend over a plurality of the dot areas. With this structure, by forming nonlinearly crooked dot areas, the filling factor of the island-shaped portions in each dot area is increased, thereby achieving bright display. Also, since the island-shaped portions are linearly arrayed while extending over a plurality of the dot areas, the dot areas can be linearly arrayed, whereby the dot areas can be densely disposed in the display area even when each dot area has a crooked two-dimensional shape.

In the exemplary liquid crystal display device according to the invention, a liquid crystal domain where liquid crystal molecules are aligned substantially in a radial pattern in plan view at the time of having a voltage applied thereon is formed in the two-dimensional area of each of the island-shaped portions. With this structure, a liquid crystal display device performing display which has a viewing-angle characteristic uniform in all directions and which is bright in a very wide range of viewing-angle is provided.

In the liquid crystal display device according to the invention, preferably, the electrode facing said each island-shaped portion has alignment control devices disposed in the centers of the respective island-shaped portions in plan view. With such a structure, a liquid crystal domain in which liquid crystal molecules are aligned substantially in a radial pattern in plan view about each of the alignment control devices as the center thereof is formed in the two-dimensional area of each of the island-shaped portions, thereby achieving bright display with a wide-viewing angle.

In the exemplary liquid crystal display device according to the invention, the alignment control devices are dielectric projections disposed on the corresponding electrode, or openings formed in the corresponding electrode by cutting out parts of the same. In the liquid crystal display device according to the invention, since these openings or projections are used as the above-mentioned alignment control devices, an inclination direction of homeotropic liquid crystal inclined at the time of having a voltage applied thereon can be excellently controlled even when any one of the above structures is applied.

In the liquid crystal display device according to the invention, the liquid crystal layer can include a chiral dopant, and liquid crystal molecules in the liquid crystal layer are aligned in a spirally radial pattern in the two-dimensional areas of the respective island-shaped portions at the time of having a voltage applied thereon. By adding a chiral dopant in the liquid crystal layer, a liquid crystal domain in which liquid crystal molecules are aligned in a spirally radial pattern having a fixed spiral direction is formed in the two-dimensional area of each of the island-shaped portions, whereby the liquid crystal in the liquid crystal layer is stably aligned and is unlikely subjected to disclination. As a result, high-quality display is achieved.

In the liquid crystal display device according to the invention, the island-shaped portions, each having an approximately hexagonal two-dimensional shape, are arrayed in a honeycomb pattern in the display area. With this structure, the filling factor of the island-shaped portions in the display area is maximized. As a result, bright display with a wide-viewing angle is achieved.

In the liquid crystal display device according to the invention, each of the island-shaped portions has, in plan view, an approximately polygonal shape and preferably has curved corners. When the island-shaped portion is formed so as to have an approximately polygonal shape in plan view, a boundary between two of the liquid crystal domains is formed at each corner of a polygon, and disclination is accordingly likely to occur at the corner. In particular, when the island-shaped portion has a quadrangular shape or a hexagonal shape having corners with a small inner angle, disclination is more likely to occur. As a countermeasure against the above problem, when the island-shaped portion is formed so as to have a shape having curved corners in the same fashion as in the above-described structure, the boundary between two of the liquid crystal domains is effectively inhibited from being formed at each corner, thereby achieving excellent display.

In the exemplary liquid crystal display device according to the present invention, the dot areas are arrayed at a pitch lying in a range smaller than 40 μm or from 50 μm to 80 μm. According to the invention, also in the case where the dot areas are arrayed at a pitch in the above-described range, a liquid crystal display device having excellent features of fast response and bright display is provided. In the known liquid crystal display device, if the dot areas are arrayed at the above-mentioned pitch, since the island-shaped portions are arrayed in a square grid pattern, when the pitch of the dot areas is 40 μm or smaller, an excessively small size of each island-shaped portion causes reduction in brightness. In the meantime, when the pitch of the dot areas lies in the range from 50 μm to 80 μm, an excessively large or small size of each island-shaped portion causes reduction in response speed or brightness in the case of the island-shaped portions being arrayed in a column or in at least two columns, respectively.

The liquid crystal display device according to the invention further includes reflective films partially formed in the dot areas, reflective display areas formed in forming areas where the reflective films are formed, and transmissive display areas formed in non-forming areas where no reflective films are formed. With this structure, a transflective liquid crystal display device performing bright display having features of a wide-viewing angle and fast-response is provided.

In the liquid crystal display device according to the invention, the liquid crystal layer has different thicknesses in the reflective and transmissive display areas from each other. In other words, the transflective liquid crystal display device according to the present invention can be formed so as to have a multiple-gap structure. With this structure, a transflective liquid crystal display device performing bright and high-contrast reflective as well as transmissive display having excellent features of a wide-viewing angle and also fast response is provided.

The exemplary liquid crystal display device according to the invention may further include stepped boundary areas formed in the dot areas so as to cause the liquid crystal layer to have different thicknesses. Each stepped boundary area is preferably disposed so as to overlap two-dimensionally with the connecting portion. When the above-mentioned multiple-gap structure is employed, the stepped boundary areas formed in the dot areas cause defective display. More particularly, in each of the stepped boundary areas, since liquid crystal molecules are aligned along its sloped surface, when an electrode is disposed in the stepped boundary area, an oblique electric field is generated when a voltage is applied on the liquid crystal molecules, thus causing a risk of disturbing the alignment of the liquid crystal molecules. With the above-described structure, as a countermeasure against this problem, any electrode is removed out of the stepped boundary area wherever possible by disposing the stepped boundary area and the corresponding connecting portion so as to overlap with each other, thereby effectively preventing deterioration in display quality.

Next, an exemplary electronic apparatus according to the invention can include one of the liquid crystal display devices set forth above. With this structure, an electronic apparatus including a display unit performing bright display with a wide-viewing angle and also having an excellent feature of fast response is provided.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Exemplary embodiments of the invention will be described below with reference to the accompanying drawings. Meanwhile, components in each drawing are appropriately magnified or scaled down in a respective manner so that each of laminated films and each component are noticeable in the figure.

Figure 1:
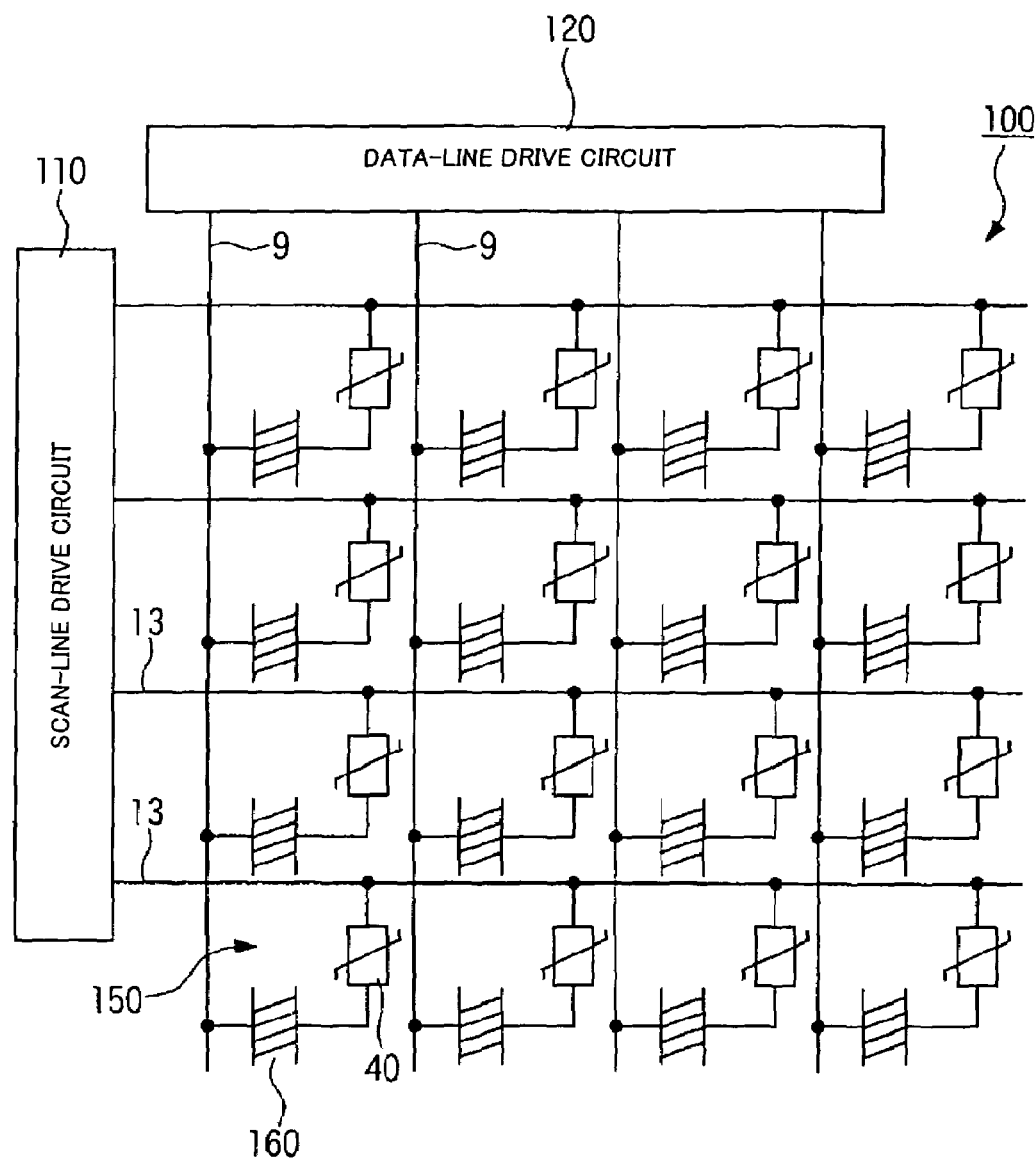
FIG. 1 is a circuit configuration of a liquid crystal display device according to a first embodiment.
Figure 2:
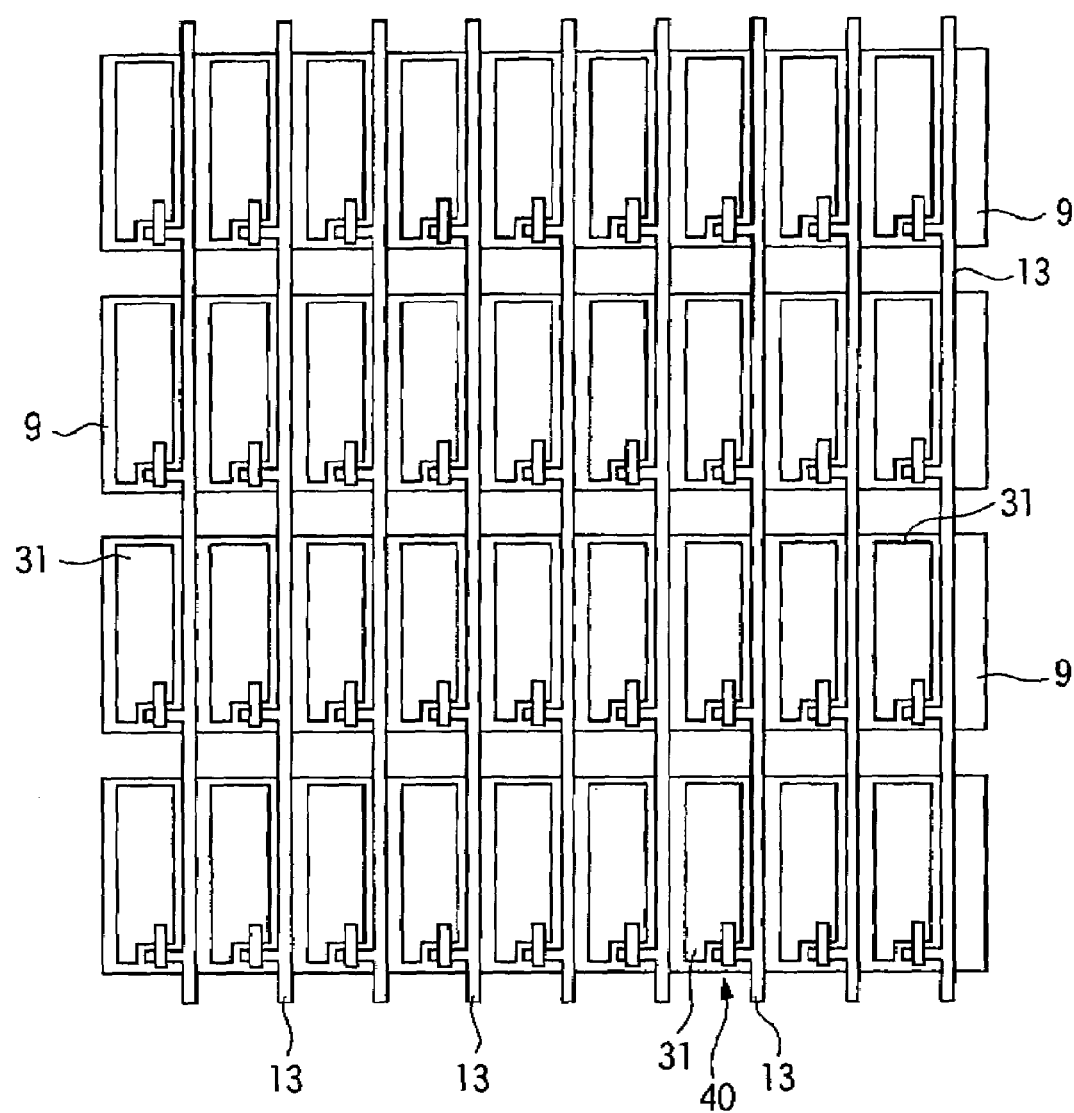
FIG. 2 two-dimensionally illustrates the configuration of electrodes of the liquid crystal display device.

FIG. 1 is an exemplary circuit configuration of a liquid crystal display device 100 according to a first exemplary embodiment of the invention. FIG. 2 schematically illustrates the two-dimensional structure of electrodes of the liquid crystal display device 100. FIG. 3 illustrates the structure of a single pixel area of the liquid crystal display device 100. The liquid crystal display device 100 illustrated in these figures is an active-matrix color liquid crystal display device using TFDs (thin film diodes, i.e., two-terminal nonlinear elements) as switching elements. Also, the liquid crystal display device 100 according to the present embodiment includes a liquid crystal layer composed of liquid crystal having a negative dielectric anisotropy because of which the liquid crystal is vertically aligned in an initial state.

As shown in FIG. 1, the liquid crystal display device 100 according to the exemplary embodiment can include a scan-line drive circuit 110 and a data-line drive circuit 120. The liquid crystal display device 100 has signal lines, that is, a plurality of scan lines 13, and a plurality of data lines 9 intersecting with the scan lines 13 disposed therein, and the scan lines 13 and the data lines 9 are respectively driven by the scan-line drive circuit 110 and the data-line drive circuit 120. In each pixel area 150, the scan line 13 and the data line 9 have a TFD element 40 and a liquid crystal display element (liquid crystal layer) 160 connected in series thereto. Meanwhile, although, in FIG. 1, the TFD element 40 is connected to the scan line 13, and the liquid crystal display element 160 is connected to the data lines 9, in contrast to the above structure, the TFD element 40 and the liquid crystal display element 160 may be connected to the data line 9 and the scan line 13, respectively.

Referring next to FIG. 2, the two-dimensional configuration of electrodes of the liquid crystal display device according to the exemplary embodiment will be described. As shown in FIG. 2, in the liquid crystal display device according to the embodiment, pixel electrodes 31 (see FIG. 3 for the detailed two-dimensional shape of each pixel electrode 31) connected to the scan lines 13 through the corresponding TFD elements 40 are arrayed in a matrix pattern, and common electrodes 9 facing these pixel electrodes 31 in a direction orthogonal to the plane of the figure are arrayed substantially in a strip pattern (in a stripe pattern) in plan view. The common electrodes 9 serve as the data lines shown in FIG. 1 and form a stripe shape in while intersecting with the scan lines 13. In the present embodiment, each of areas having the respective pixel electrodes 31 formed therein serves as a single dot area, and each of dot areas arrayed in a matrix pattern is capable of performing display.

Meanwhile, each TFD element 40 serves as a switching element connecting the corresponding scan line 13 and pixel electrode 31 to each other. The TFD element 40 has a metal-insulator-metal structure (MIM structure) in which, for example, a first conductive film mainly composed of tantalum, an insulating film formed on the upper surface of the first conductive film and mainly composed of a tantalum oxide, and a second conductive film formed on the upper surface of the insulating film and mainly composed of chromium are included. Also, the first and second conductive films of the TFD element 40 are connected to the corresponding scan line 13 and pixel electrode 31, respectively.

Figure 3A:
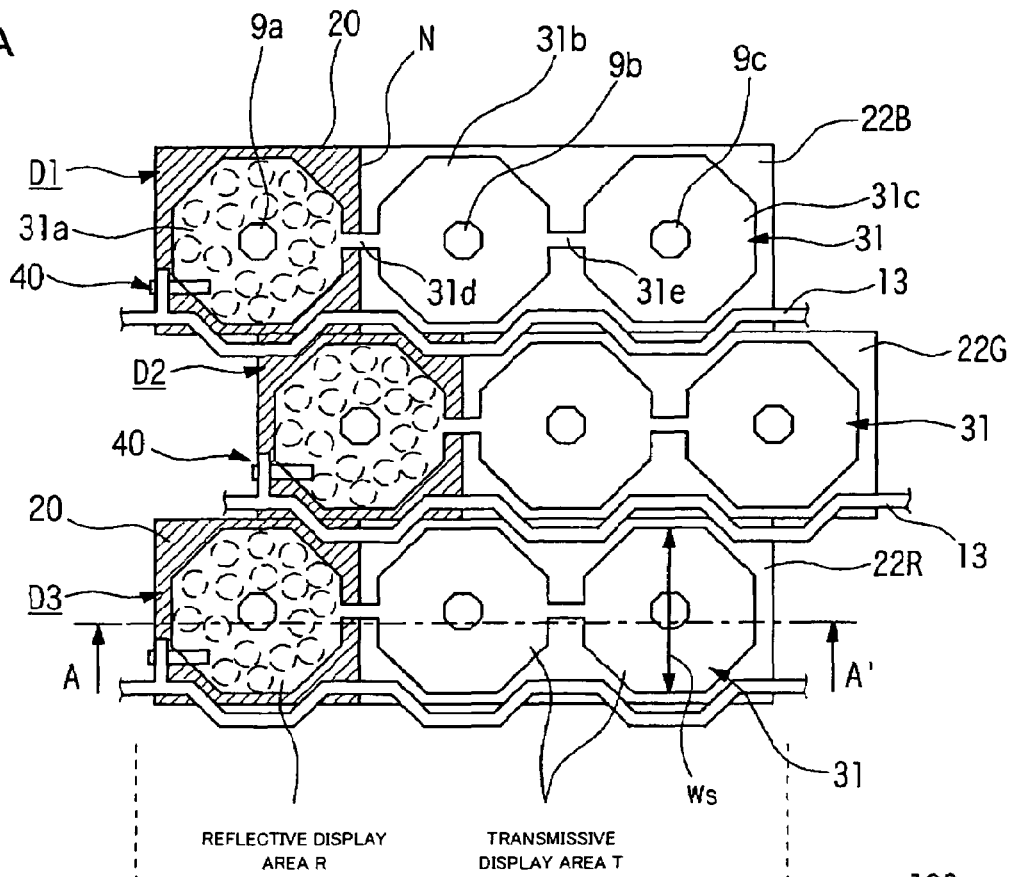
FIG. 3 is a magnification of a pixel area of the liquid crystal display device, wherein (a) and (b) are respectively a plan view and a sectional view illustrating the configuration of the pixel area.
Figure 3B:
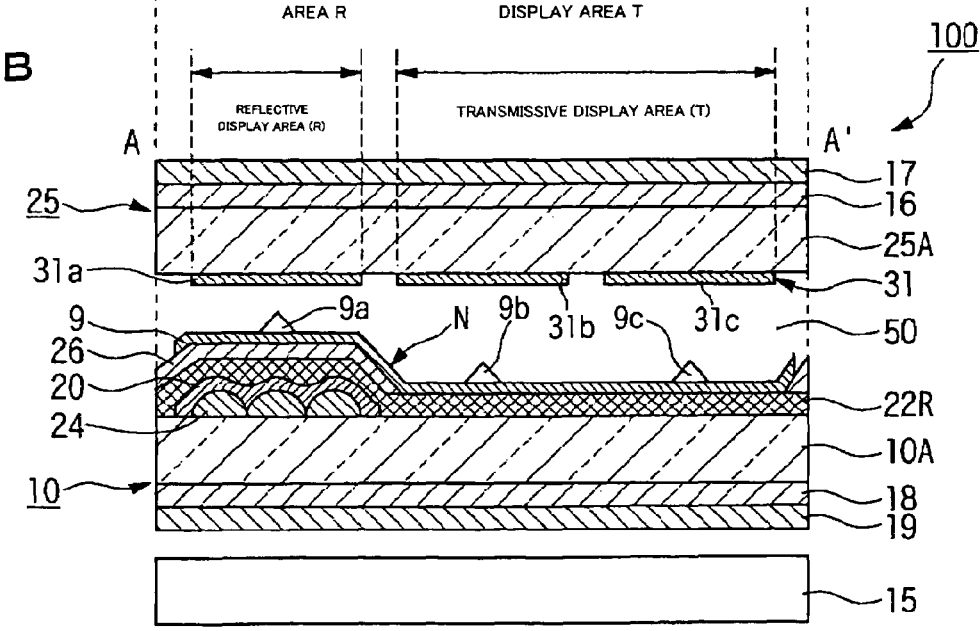

Referring next to FIG. 3, the structure of each pixel of the liquid crystal display device 100 according to the embodiment will be described. FIG. 3(a) illustrates the two-dimensional configuration of a single pixel area of the liquid crystal display device 100, and FIG. 3(b) illustrates the sectional structure of the same taken along the line A-A' indicated in FIG. 3(a). As shown in FIG. 2, the liquid crystal display device 100 according to the exemplary embodiment has dot areas including the corresponding pixel electrodes 31 and surrounded by the data lines 9, the scan lines 13, and so forth. As shown in FIG. 3(a), a color filter for one of three primary colors is formed so as to correspond to a single dot area, and thus three dot areas D1 to D3 make up a pixel including color filters 22R, 22G, and 22B for the three colors.

As shown in FIG. 3(a), each pixel electrode 31 can include three island-shaped portions 31a to 31c, and connecting portions 31d and 31e electrically connecting mutually adjacent two of the island-shaped portions to each other. More particularly, the island-shaped portions 31a to 31c, each having an octagonal shape in plan view and substantially the same plane area as one anther, are arrayed in an extending direction (a horizontal direction in the figure) of the dot areas, and the connecting portions 31d and 31e extending substantially parallel to an arraying direction of the island-shaped portions 31a to 31c are respectively disposed between the island-shaped portions 31a and 31b and between the island-shaped portions 31b and 31c. Also, the scan lines 13 are formed, each having a snake shape, disposed in the boundary area between two of the dot areas, extending along the edges of the island portions, and connected to the island-shaped portion 31a through the corresponding TFD element 40. Components denoted by reference numbers 9a to 9c and disposed in the centers of the respective two-dimensional areas of the island-shaped portions 31a to 31c are dielectric projections (alignment-controlling devices) composed of an insulating material and disposed on each of the common electrodes 9 facing the pixel electrodes 31.

Also, in the present embodiment, the central dot area D2 is displaced by half a pitch of the island-shaped portions 31a to 31c in an extending direction of the scan lines 13. That is, the pixel area formed by the dot areas D1 to D3 has the nine island-shaped portions disposed therein in a stagger pattern in plan view.

The island-shaped portions 31a are disposed in forming areas in each dot area, where corresponding reflective films 20 are partially formed, and the remaining island-shaped portions 31b and 31c are disposed in areas (non-forming areas) in the dot area, where the reflective films 20 are not formed. Accordingly, the two-dimensional area of the island-shaped portions 31a (and a part of the connecting portions 31d) disposed in the forming area of the corresponding reflective film 20 serves as a reflective display area R of the liquid crystal display device 100, and the two-dimensional area of the island-shaped portions 31b and 31c and a part of the connecting portion 31d, and the connecting portion 31e disposed in the corresponding non-forming area serves as a transmissive display area T of the same.

In the meantime, as shown in FIG. 3(b), in the liquid crystal display device 100 according to the exemplary embodiment, liquid crystal aligned vertically in an initial state, that is, a liquid crystal layer 50 composed of liquid crystal having a negative dielectric anisotropy, is sandwiched between an upper substrate (element substrate) 25 and a lower substrate (counter substrate) 10 disposed so as to face the upper substrate 25. Also, in the liquid crystal display device 100, a backlight (illumination device) 15 serving as a light source for transmissive display is disposed outside the lower substrate 10.

As described above, the liquid crystal display device according to the embodiment is a homeotropic, transflective liquid crystal display device including the homeotropic liquid crystal layer 50 and being capable of performing reflective and transmissive display.

The lower substrate 10 has a structure in which the reflective films 20 composed of a highly reflective metal film, such as aluminum or silver, are partially formed on the upper surface of a main substrate 10A composed of a transmissive material, such as quartz or glass, having an insulating film 24 interposed therebetween, and the reflective display area R is disposed in the forming area of the corresponding reflective film 20. The upper surface of the insulating film 24 formed on the main substrate 10A is undulated, and the upper surface of the corresponding reflective film 20 is accordingly undulated. Thus, since reflective light is scattered with such undulation, the light is prevented from being reflected from outside in the display device, thereby achieving excellent visibility.

The color filter 22R for red color is disposed, in the corresponding dot area, on the reflective film 20 and on the main substrate 10A so as to extend over the reflective display area R and the transmissive display area T. As shown in FIG. 3(a), the color filters 22R (red), 22G (green), and 22B (blue) for the three colors are two-dimensionally disposed, and the boundary between adjacent two of the color filters substantially overlaps two dimensionally with an extending area of each scan line 13.

The color filter 22R has an insulating film 26 selectively formed thereon so as to lie above the reflective film 20. The insulating film 26 partially formed in the dot area as described above causes the liquid crystal layer 50 to have different thicknesses in the reflective display area R and in the transmissive display area T from each other. The insulating film 26 is composed of an organic material film, such as acrylic resin, having an example thickness of about 0.5 μm to 2.5 μm and provides a boundary stepped area N in the vicinity of the boundary between the reflective display area R and the transmissive display area T, including the inclined surface thereof, where the thickness of the film varies continuously. The liquid crystal layer 50 has a thickness of about 2 μm to 7 μm in the transmissive display area T and, in the reflective display area R, has a thickness nearly half the thickness in the transmissive display area T.

As described above, the insulating film 26 serves as a layer for adjusting the thickness of the liquid crystal layer, causing the liquid crystal layer 50 to have different thicknesses in the reflective display area R and in the transmissive display area T from each other in accordance with its own different thicknesses. Also, in the case of the exemplary embodiment, the edge of a flat plane above the insulating film 26 agrees substantially with the edge of the island-shaped portion 31a forming the pixel electrode 31 close to the upper substrate 25, and the boundary stepped area N formed by the insulating film 26 is disposed so as to overlap in plan view with the connecting portion 31d lying between the island-shaped portions 31a and 31b.

Thus, each common electrode 9 composed of a transparent conductive material such as ITO is formed on the upper surfaces of the lower substrate 10 and the insulating film 26. The common electrodes 9 are formed substantially in a stripe pattern in plan view, each extending in a direction orthogonal to the plane of the figure and serving as a common electrode for the plurality of dot areas juxtaposed to one another in the direction orthogonal to the plane of the figure. In the meantime, both edges of the common electrode 9 extending in the vertical direction in the figure define a two-dimensional shape of a rectangular waveform, extending along the contour of the pixel area formed by the dot areas D1 to D3.

The dielectric projections 9a to 9c corresponding to the respective dot areas are formed on the common electrode 9. As shown in FIG. 3(a), the dielectric projections 9a to 9c respectively corresponding to the island-shaped portions 31a to 31c of the pixel electrode 31 are disposed substantially in the centers of the two-dimensional areas of the island-shaped portions 31a to 31c.

Meanwhile, although not shown in the figure, a homeotropic alignment film composed of polyimide or the like is formed so as to cover the common electrodes 9 and the dielectric projections 9a to 9c. The homeotropic alignment film serves so as to align liquid crystal molecules orthogonally to the film surface thereof, and preferably in the exemplary embodiment, is not subjected to an alignment treatment, such as a rubbing treatment.

Although, in the exemplary embodiment, the reflective film 20 and the common electrode 9 are independently disposed and are then laminated, in the reflective display area R, the reflective film composed of metal material may be used as a part of the common electrode.

Next, close to the upper substrate 25, and on the surface close to the liquid crystal layer 50, of a main substrate 25A composed of a transmissive material, such as glass or quartz, the pixel electrodes 31 are formed, each composed of a transparent conductive material such as ITO and having a two-dimensional shape shown in FIG. 3(a), and the TFD element 40 and the scan line 13 corresponding to each pixel electrode 31 are disposed. Although not shown in the figure, a homeotropic alignment film composed of polyimide or the like is formed so as to cover the pixel electrodes 31.

Close to the outer surface of the lower substrate 10, a circular polarizer formed by laminating a retardation film 18 and a polarizer 19 in that order from the main substrate 10A is disposed, and close to the outer surface of the upper substrate 25, another circular polarizer formed by laminating a retardation film 16 and a polarizer 17 in that order from the main substrate 25A is disposed. In other words, in the liquid crystal display device 100 according to the exemplary embodiment, circularly polarized light is incident on the liquid crystal layer 50 so as to perform display. With such a structure, uneven transmittance of light is prevented from occurring in the dot area, for example, when linearly polarized light is incident on the liquid crystal layer 50, depending on an alignment direction of liquid crystal molecules aligned at the time of having a voltage applied thereon thereof, thereby actually improving an aperture ratio of the dot area, and hence resulting in an improved luminance of display of the liquid crystal display device.

The above-mentioned circular polarizer may be a circular polarizer formed by combining a polarizer and a λ/4 retardation film; a broadband circular polarizer formed by combining a polarizer, a λ/2 retardation film, and a λ/4 retardation film; or a circular polarizer formed by combining a polarizer, a λ/2 retardation film, a λ/4 retardation film, and a negative C-plate and having a viewing-angle compensating function. Meanwhile, the term C-plate is defined by a retardation film having an optical axis in the thickness direction thereof.

In the liquid crystal display device 100 according to the present embodiment, each pixel electrode 31 has the regular octagonal island-shaped portions 31a to 31c disposed therein while being electrically connected by the corresponding connecting portions 31d and 31e, and also, each common electrode 9 has the dielectric projections 9a to 9c corresponding to the island-shaped portions 31a to 31c disposed thereon. Hence, an inclination direction of liquid crystal molecules inclined when an electric field is applied thereon is appropriately controlled, thereby performing display having an excellent viewing-angle characteristic. The alignment control operation will be described below.

In a state of no electric field is applied between the common electrodes 9 and the pixel electrodes 31 (that is, at the time of no voltage being applied), liquid crystal molecules of the liquid crystal layer 50 are first aligned orthogonally to the surface of the substrate. Then, when a voltage is applied between the electrodes 9 and 31, liquid crystal molecules disposed in the two-dimensional area of the island-shaped portion 31a are inclined with an oblique electric field generated in each edge portion of the island-shaped portion 31a, toward a direction orthogonal to the surface of the edge portion (that is, toward the center of the surface of the island-shaped portion 31a), and liquid crystal molecules around the foregoing liquid crystal molecules are inclined toward the same direction as above so as to match with an alignment state of those in the edge portion of the island-shaped portion 31a. As a result, the liquid crystal molecules disposed in the two-dimensional area of the island-shaped portion 31a are aligned toward the center of the regular octagonal island-shaped portion 31a at the time of having a voltage applied thereon.

Also, in the case of the exemplary embodiment, since the octagonal prism-shaped dielectric projection 9a is disposed substantially at the center of the two-dimensional area of the island-shaped portion 31a, liquid crystal molecules are vertically aligned by the homeotropic alignment film disposed on the upper surface of the island-shaped portion 31a along the upper surface of the dielectric projection 9a, and are resultantly aligned obliquely with respect to the surface of the substrate. Then, when a voltage is applied between the electrodes 9 and 31, since liquid crystal molecules around the dielectric projection 9a are inclined toward the direction along which the foregoing liquid crystal molecules are obliquely aligned, the liquid crystal molecules disposed in the two-dimensional area of the island-shaped portion 31a are aligned in a radial pattern in plan view with respect to the dielectric projection 9a as the center thereof.

As described above, in the liquid crystal display device 100 according to the exemplary embodiment, with an oblique electric field generated in each peripheral edge portion of the island-shaped portion 31a at the time of having a voltage being applied and also with an alignment control operation due to the surface configuration of the dielectric projection 9a, a liquid crystal domain in which liquid crystal molecules are aligned in a radial pattern in plan view is formed in the two-dimensional area of the island-shaped portion 31a. Also, with alignment control operations similar to that of the island-shaped portion 31a, liquid crystal domains in which liquid crystal molecules are aligned in a radial pattern in plan view are formed in the two-dimensional areas of the island-shaped portions 31b and 31c.

With the above-mentioned operations, in the liquid crystal display device 100 according to the exemplary embodiment, since liquid crystal domains in which liquid molecules are aligned in a radial pattern in plan view are arrayed in the dot areas D1 to D3 at the time of having a voltage applied thereon, its viewing-angle characteristic is made uniform in all directions by the respective liquid crystal domains, and also, since disclination occurring in the centers of the liquid crystal domains is fixed in the island-shaped portions 31a to 31c, roughly-finished-looking, stain-like unevenness is prevented from occurring when its panel is obliquely viewed. Accordingly, the liquid crystal display device 100 according to the present embodiment performs high-quality display over a very-wide-viewing angle range.

In the liquid crystal display device according to the above-described embodiment, the liquid crystal layer 50 may be composed of homeotropic liquid crystal having a chiral dopant added therein. In this case, liquid crystal domains in which liquid crystal molecules are aligned, at the time of having a voltage applied thereon, in a spirally radial pattern in plan view, about the corresponding dielectric projections 9a to 9c as the centers thereof are formed in the two-dimensional areas of the island-shaped portions 31a to 31c. By forming the liquid crystal domains in which liquid crystal molecules are aligned in a spiral pattern as described above, even when display is performed by making linearly polarized light incident on the liquid crystal layer 50, uneven luminance is unlikely to occur in the dot area, thereby achieving bright display. Also, when a chiral dopant is not added, depending on the configurations of the island-shaped portions 31a to 31c, and the dielectric projections 9a to 9c, there is a possibility that, when a voltage is applied, a liquid crystal domain and another liquid crystal domain in which liquid crystal molecules are respectively aligned clockwise and counter-clockwise about the dielectric projections 9a to 9c as the centers thereof exist together in the two-dimensional areas of the island-shaped portions 31a to 31c. When liquid crystal domains in which liquid crystal molecules are aligned in different directions from each other exist together as described above, disclination sometimes occurs in the boundary between adjacent domains. Hence, a chiral dopant is effective for achieving a stable alignment state of liquid crystal.

In the liquid crystal display device 100 according to the present exemplary embodiment having the above structure, as shown in FIG. 3(a), of the dot areas D1 to D3 including the island-shaped portions 31a to 31c, each having an octagonal shape in plan view, the dot area D2 is displaced in the extending direction of the scan lines 13 by half a pitch of the island-shaped portions, thereby achieving display having excellent transmittance (reflectance) and quick response features. An operation of the liquid crystal display device 100 will be described with reference to FIGS. 1 to 3, and 9.

Figure 9A:
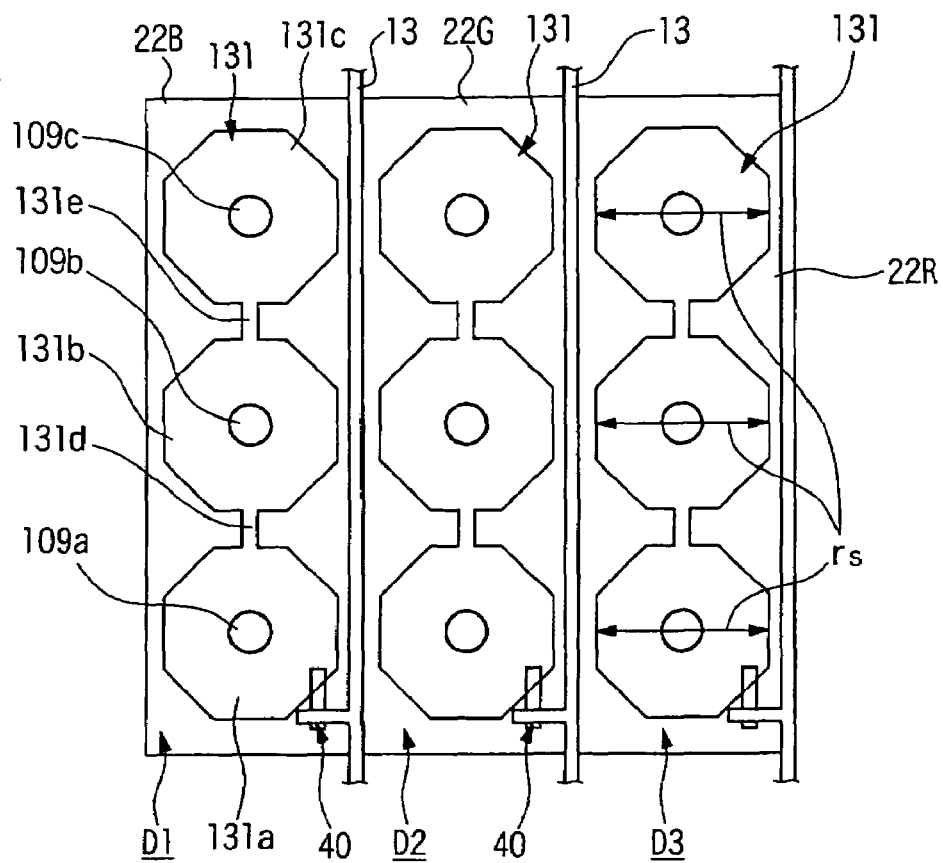
FIG. 9 is a graph illustrating the relationship between transmittance or response time and size of each island-shaped portion.

FIG. 9(a) is a plan view illustrating the configuration of a pixel area of a transmissive liquid crystal display device which has the dot areas D1 to D3, each including a plurality of island-shaped portions 131a to 131c and connecting portions 131d to 131e electrically connecting these island-shaped portions and mainly composed of a pixel electrode 131 and in which the pluralities of island-shaped portions 131a, 131b, and 131c are arrayed in a square pattern in plan view. The island-shaped portions 131a to 131c respectively have dielectric projections 109a to 109c disposed substantially in the centers of the two-dimensional areas thereof. Of the components shown in FIG. 9(a), those denoted by the same reference numbers are the same as those shown in FIG. 3.

Figure 9B:
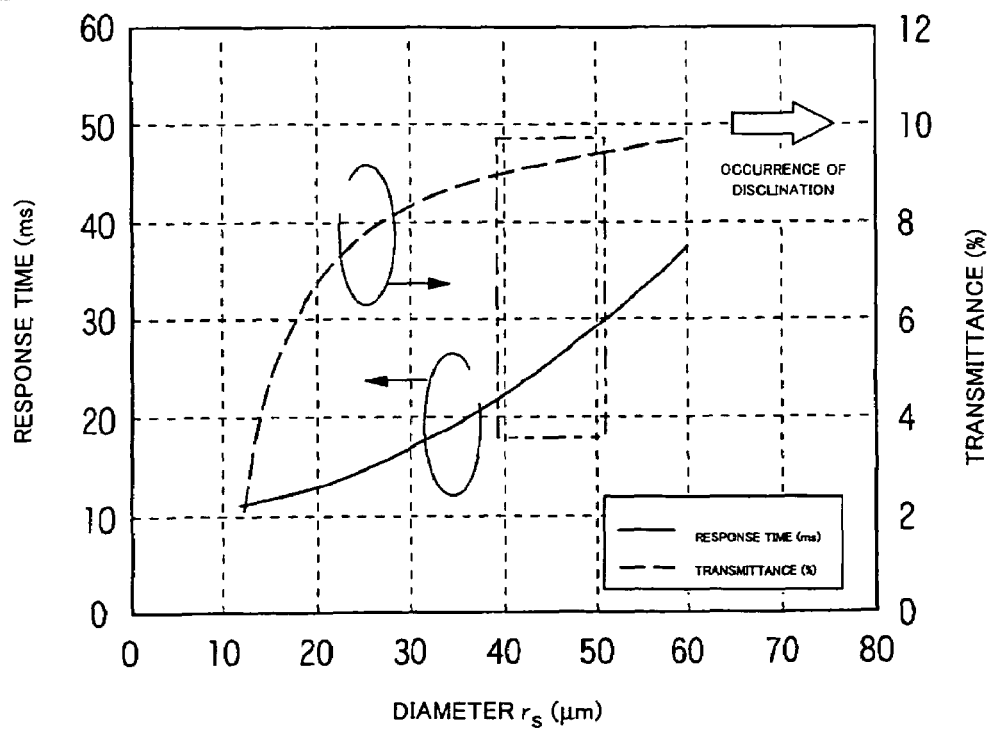

Also, FIG. 9(b) is a graph of measured results of transmittances (%) and response times (ms) of the liquid crystal display device by varying the diameter $r_s$ (μm) of each of the island-shaped portions 131a to 131c shown in FIG. 9(a).

As shown in FIG. 9(b), when the diameter $r_s$ of each of the island-shaped portions 131a to 131c is made greater, the area ratios of the dielectric projections 109a to 109c serving as alignment control means to the corresponding island-shaped portions 131a to 131c become smaller, and the corresponding aperture ratio becomes greater accordingly, thereby leading to a higher transmittance. Also, since liquid crystal molecules in a homeotropic mode start to move one by one from both peripheries of the dielectric projections and the island-shaped portions 131a to 131c when a voltage is applied, when the diameter $r_s$ is made smaller, the response time becomes shorter. In addition, when the diameter $r_s$ is made excessively greater, an alignment control of liquid crystal molecules in the two dimensional area of each of the island-shaped portions 131a to 131c cannot be appropriately performed, thereby sometimes causing disclination. Taking these transmittance and response time into account, the optimal diameter $r_s$ of each of the island-shaped portions 131a to 131c is in the range from about 40 to 50 μm (in FIG. 9(b), the range is indicated by an area encircled by a two-dotted rectangular chain line).

In the liquid crystal display device shown in FIG. 9(a), when a definition equivalent to 200 ppi (200 pieces of pixels arrayed every length of 25.4 mm) is achieved, the size of a single dot is about 42 μm by 126 μm. When the island-shaped portions 131a to 131c are arrayed in a square grind pattern in the dot areas D1 to D3 each having such a size, the diameter $r_s$ of each of the island-shaped portions 131a to 131c is about 34 μm and is out of the optimal range shown in FIG. 9(b), thereby resulting in a lowered transmittance.

On the contrary, in the liquid crystal display device 100 according to the present exemplary embodiment shown in FIG. 3, since the central dot area D2 is displaced by half a pitch of the island-shaped portions 31a to 31c, each of the island-shaped portions 31a to 31c can be widely formed by extending toward the neighboring dot areas. In other words, when each of the island-shaped portions 31a to 31c is extended toward non-display areas of the neighboring dot areas by making its width $w_s$ shown in FIG. 3(a) greater, the aperture ratio of each of the dot areas D1 to D3 is improved without changing the plane area of the pixel area. To be more specific, the width $w_s$ of each of the island-shaped portions 31a to 31c can be made greater by about 15% than in the case where the island-shaped portion has a regular octagonal shape. With this arrangement, the width $w_s$ of each of the island-shaped portions 31a to 31c can be made so as to lie within the optimal diameter range (the range from about 40 μm to about 50 μm) shown in FIG. 9(b), thereby achieving a bright display without reducing its response speed.

Meanwhile, in the liquid crystal display device 100 according to the present embodiment, although, in the pixel area in the figure, the dot area D2 for green color is displaced rightward in the figure, in the pixel areas adjacent to the above-mentioned pixel area with respect to the vertical direction in the figure, the dot areas D2 for green color are displaced leftward. In other words, the dot areas D1 to D3 are disposed so as to protrude alternately rightward and leftward with respect to their arrangement in the vertical direction in the figure. When the dot areas D1 to D3 are alternately displaced as described above, although it is assumed that this arrangement may adversely affect on display, in the case of the present embodiment, since each of the dot areas D1 to D3 is displaced merely by half a pitch of the island-shaped portions 31a to 31c, and also, the dot pitch is small (that is, 42 μm), the above-described arrangement rarely adversely affects on display.

In the liquid crystal display device 100 according to the present embodiment, the thickness of the liquid crystal layer 50 in the reflective display area R can be made about half that of the same in the transmissive display area T by the insulating film 26 disposed in the reflective display area R, whereby retardation of the liquid crystal layer in the reflective display area R can be made substantially equal to that of the same in the transmissive display area T. With this arrangement, electrooptical characteristics in these two areas can be made substantially the same as each other, thereby improving display contrast.

In addition, with the above-described multiple-gap structure, the boundary stepped area N formed in the dot areas is disposed so as to overlap two-dimensionally with the connecting portion 31d extending in the area between the island-shaped portion 31a in the reflective display area R and the island-shaped portion 31b in the transmissive display area T, thereby effectively inhibiting deterioration in display quality caused by the boundary stepped area N. In other words, when an electrode is formed in the boundary stepped area N, since liquid crystal molecules are obliquely aligned with respect to the surface of the substrate, the liquid crystal molecules are subjected to a weak alignment-controlling force at the time of having a voltage applied thereon. When the structure of a pixel is designed in disregard of this weak alignment-controlling force, there is a risk of disturbed alignment of liquid crystal. For example, in a liquid crystal display device disclosed in, for example, "Development of transflective LCD for high contrast and wide viewing angle by using homeotropic alignment", M. Jisaki et al., Asia Display/IDW'01, p. 133-136 (2001), this weak alignment-controlling force is positively utilized for its alignment control. In the liquid crystal display device according to the present embodiment, by removing an electrode disposed in the boundary stepped area N wherever possible so as to remove this weak alignment-controlling force, and, on the contrary, to make a strong alignment-controlling force due to an oblique electric field generated in each edge of each of the island-shaped portions 31a and 31b dominant, excellent display is achieved both in the reflective display area R and the transmissive display area T.

As described above, the liquid crystal display device 100 according to the present exemplary embodiment has a structure in which an inclination direction of liquid crystal molecules of the liquid crystal layer in a homeotropic mode is appropriately controlled by the configuration of the pixel electrodes 31 close to the upper substrate 25 and the dielectric projections 9a to 9c disposed on each common electrode 9, and also, by disposing the dot areas D1 to D3 so as to be alternately displaced in the arraying direction thereof, an aperture ratio of each of the dot areas D1 to D3 is improved without changing the pitch of a pixel, and the size of each of the island-shaped portions 31a to 31c can be set within the optimal range in which excellent alignment control of liquid crystal is performed. With this structure, high-contrast display with a wide-viewing angle and free from problems of display quality such as roughly-finished-looking, stain-like unevenness, burn-in, and the like is achieved, and also, reflective display and transmissive display having an excellent response feature of liquid crystal are achieved.

Meanwhile, in the above-described embodiment, although the octagonal prism-shaped dielectric projections 9a to 9c are disposed on each common electrode 9 so as to serve as alignment control means, openings may be formed instead by cutting out parts of the common electrode 9 so as to serve as such alignment control devices. In this case, the openings have an advantage of controlling the inclination direction of liquid crystal molecules inclined when an electric field is applied thereon although an operation of the openings is different from that of the dielectric projections 9a to 9c. Alternatively, the above-mentioned opening and dielectric projection may be disposed together in the same dot area. When the plane areas of the opening and the dielectric projection are the same as each other, since the dielectric projection generally provides a greater alignment-controlling force than that of the opening, the display device preferably has a structure in which, for example, the opening is disposed in the reflective display area R where the liquid crystal layer has a thin thickness, and the dielectric projection is disposed in the transmissive display area T where the liquid crystal layer has a thick thickness. Further, the dielectric projections 9a to 9c may be disposed inside the openings.

Also, in the above-described embodiment, although the liquid crystal display device is of the most commonly known transflective type by way of example, the liquid crystal display device 100 serves as a transmissive type or a reflective type when the reflective display area R or the transmissive display area T is removed therefrom, respectively. In either type of structure, the two-dimensional structure of the pixel area shown in FIG. 3(a) is applicable as it is, and the above-described advantages of the present invention can be likewise achieved.

In addition, in the present exemplary embodiment, although the liquid crystal display device is of an active matrix type, including TFD elements as switching elements for driving respective dots, the present invention is also applicable not only to an active matrix liquid crystal display device including TFT (thin film transistors) elements but also to a passive matrix liquid crystal display device.

Figure 4:
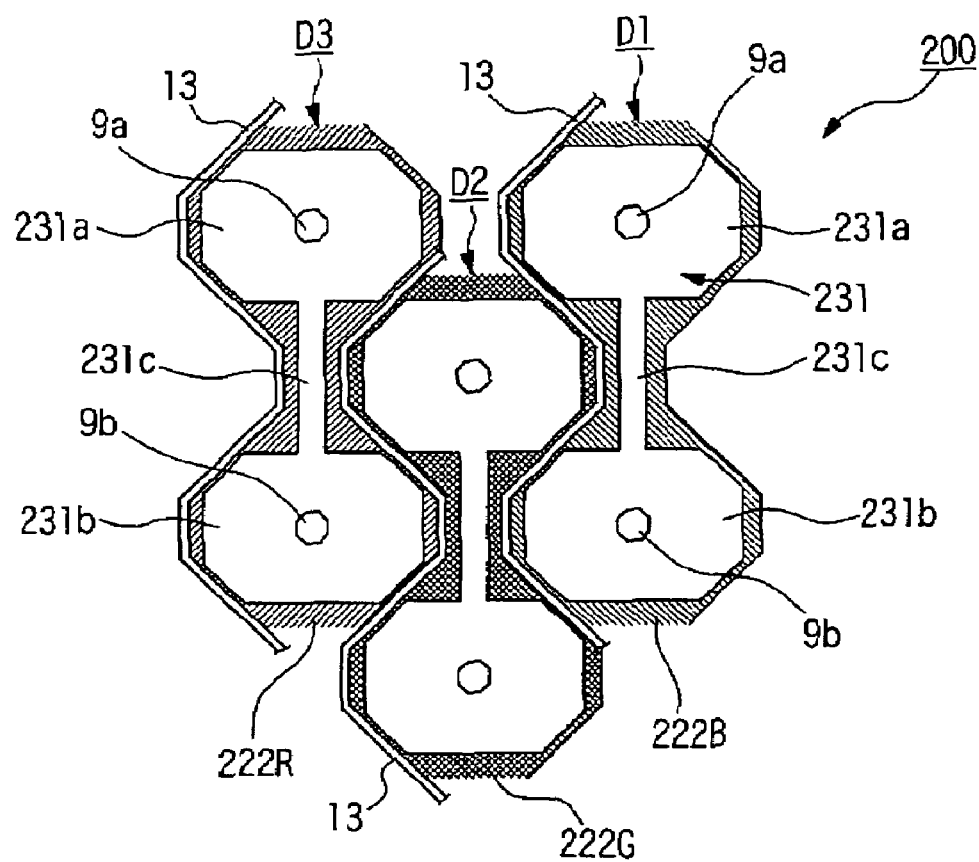
FIG. 4 is a plan view illustrating the configuration of a pixel area of a liquid crystal display device according to a second exemplary embodiment.

Next, a liquid crystal display device 200 according to a second exemplary embodiment with reference to FIG. 4. FIG. 4 is a plan view illustrating the configuration of a pixel area of the liquid crystal display device according to the present embodiment and corresponds to FIG. 3(a) in the first exemplary embodiment.

The liquid crystal display device 200 according to the embodiment is a homeotropic-mode transmissive liquid crystal display device which includes pixel electrodes 231, each having a two-dimensional shape different from that of each pixel electrode 31 and which is intended to be a higher-definition device than the liquid crystal display device 100 shown in FIG. 3. Meanwhile, components in FIG. 4 denoted by the same reference numbers as those in FIG. 3 are the same as those in FIG. 3, and their descriptions are omitted.

The pixel area shown in FIG. 4 has the three dot areas D1 to D3 disposed therein. Each dot area has the corresponding pixel electrode 231 disposed therein, formed by island-shaped portions 231a and 231b, each having an octagonal shape in plan view, and by a connecting portion 231c extending vertically in the figure so as to connect these island-shaped portions. Also, the dot areas D1 to D3 respectively have color filters 222B, 222G, and 222R disposed therein so as to correspond to the forming areas of the respective pixel electrodes 231. In the pixel area shown in the figure, the dot area D2 is displaced downward relative to the other dot areas D1 and D3, and the island-shaped portion 231a thereof is disposed adjacent to the respective connecting portions 231c of the dot areas D1 and D3 lying on both sides thereof. Also, the scan lines 13 are formed, each extending vertically in the figure so as to have a snake-shape along respective edges of the island-shaped portions 231a and 231b and connected to the island-shaped portion 231a (or 231b) of each dot area through the corresponding TFD element (not shown).

Also, the island-shaped portions 231a and 231b have the corresponding dielectric projections 9a and 9b disposed substantially in the centers of the two-dimensional areas thereof, and, due to an oblique electric field generated in each edge of each of the island-shaped portions 231a and 231b at the time of having a voltage applied and also to an alignment control operation of each of the dielectric projections 9a and 9b, a liquid crystal domain in which liquid crystal molecules are aligned in a radial pattern about each of the dielectric projections 9a and 9b as the center thereof is formed in the two-dimensional area of each of the island-shaped portions 231a and 231b.

When the dot pitch is made further smaller down to 30 μm or less so as to achieve a higher-definition liquid crystal display device than the liquid crystal display device 100 shown in FIG. 3, the diameter $r_s$ lies out of the optimal range (from 40 μm to 50 μm) shown in FIG. 9(b), inevitably leading to reduction in transmittance. In view of the above problem, when the size of each dot area is, for example, 28 μm by 84 μm (corresponding to 300 ppi), the configuration of the pixel area shown in FIG. 4 according to the present embodiment is employed, that is, the number of pieces of island-shaped portions in a single dot area is reduced to two and also the neighboring dot areas are displaced in the vertical direction in the figure by a pitch of the island-shaped portion. With this structure, the size of each of the island-shaped portions 231a and 231b can be maximized up to 32 μm by 22 μm, thereby densely disposing dot areas having a high aperture ratio, and accordingly achieving a super high-definition liquid crystal display device having high transmittance.

Meanwhile, in the exemplary embodiment, although the liquid crystal display device is of a transmissive type, when reflective films are formed in the respective forming areas of the island-shaped portions 231a and 231b, the liquid crystal display device serves as a reflective type, and when a reflective film is formed in the forming area of each island-shaped portion 231a, the liquid crystal display device serves as a transflective type.

Next, a liquid crystal display device 300 according to a third exemplary embodiment will be described. In the liquid crystal display device 100 shown in FIG. 3, although the dot areas D1 to D3 are alternately displaced in the array direction (in the horizontal direction in FIG. 3(a)) of the island-shaped portions 31a to 31c disposed in each dot area, the array configuration of island-shaped portions of the liquid crystal display device according to the present invention is not limited to that shown in FIG. 3 and may one of a variety of configurations. In the present embodiment, another configuration of island-shaped portions will be described with reference to FIG. 5.

Figure 5:
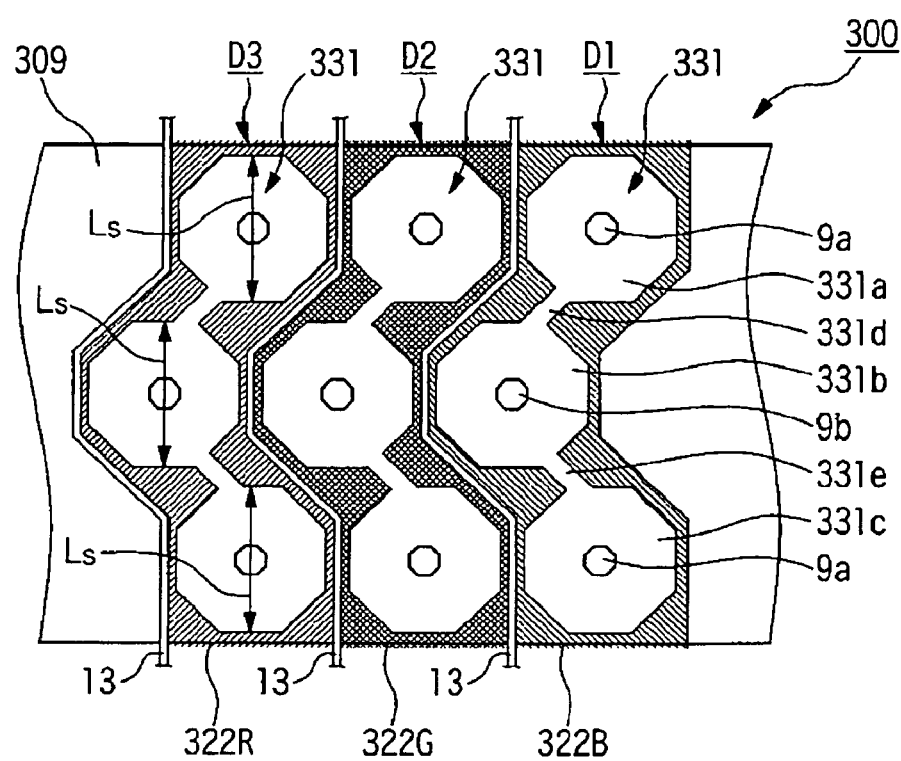
FIG. 5 is a plan view illustrating the configuration of a pixel area of a liquid crystal display device according to a third exemplary embodiment.

FIG. 5 is a plan view illustrating the configuration of a pixel area of the liquid crystal display device according to the present exemplary embodiment and corresponds to FIG. 3(a) in the first embodiment. The liquid crystal display device 300 according to the present embodiment is a homeotropic-mode transmissive liquid crystal display device including pixel electrodes 331, each having a two-dimensional shape different from that of the pixel electrode 31 of the liquid crystal display device 100 shown in FIG. 3. Meanwhile, components in FIG. 5 denoted by the same reference numbers as those in FIG. 3 are the same as those in FIG. 3, and their descriptions are omitted.

The pixel area shown in FIG. 5 has the three dot areas D1 to D3 disposed therein, and each dot area has the corresponding pixel electrode 331 disposed therein, formed by island-shaped portions 331a to 331c, each having an octagonal shape in plan view, and by belt-like connecting portions 331d and 331e connecting these island-shaped portions. Also, the dot areas D1 to D3 respectively have color filters 322B, 322G, 322R disposed therein so as to correspond to the forming areas of the respective pixel electrodes 331. In addition, belt-like common electrodes 309 are disposed, each extending in the horizontal direction in the figure and covering the corresponding pixel electrodes 331 in plan view.

In the pixel area shown in the figure, the central island-shaped portion 331b of each of the dot areas D1 to D3 is displaced leftward in the figure by half a pitch of the island-shaped portions 331a to 331c relative to the other island-shaped portions 331a and 331c. Accordingly, each of the dot areas D1 to D3 is formed so as to have an approximately C-shape (or elbowed shape) in plan view. Also, the scan lines 13 are formed, each extending vertically in the figure so as to have a snake shape along respective edges of the island-shaped portions 331a to 331c and connected to one of the island-shaped portions 331a to 331c of each dot area through the corresponding TFD element (not shown).

Also, the dielectric projections 9a to 9c corresponding to the respective island-shaped portions 331a to 331c are disposed substantially in the centers of the two-dimensional areas of the same, and, due to an oblique electric field generated in each edge of each of the island-shaped portions 331a and 331c during application of a voltage, and also to an alignment control operation of each of the dielectric projections 9a to 9c, a liquid crystal domain in which liquid crystal molecules are aligned in a radial pattern about each of the dielectric projections 9a to 9c as the center thereof is formed in the two-dimensional area of each of the island-shaped portions 331a to 331c.

In the liquid crystal display device 100 according to the first exemplary embodiment shown in FIG. 3, although its aperture ratio is improved by alternately displacing the dot areas D1 to D3, each having the island-shaped portions 31a to 31c linearly arrayed therein in a direction along the long sides thereof so as to make the width $w_s$ of each of the island-shaped portions 31a to 31c greater, in the liquid crystal display device 300 according to the present embodiment, as shown in FIG. 5, the central island-shaped portion 331b is displaced in a direction along the short sides of the dot areas D1 to D3 so as to make a length $L_s$ of each of the island-shaped portions 331a to 331c greater in the direction along the long sides of the dot areas. More particularly, the length $L_s$ of each of the island-shaped portions 331a to 331c shown in FIG. 5 can be made greater by about 15% relative to that of a regular octagonal island-shaped portion. With this structure, even when the size of each island-shaped portion is out of the optimal range shown in FIG. 9(b) when the island-shaped portions are arrayed in a square grid pattern and resultantly its transmittance and response speed is reduced, by making the length $L_s$ of each of the island-shaped portions 331a to 331c greater, the size of each island-shape portion can be set within the optimal diameter range (about 40 μm to 50 μm) shown in FIG. 9(b), thereby achieving bright display without reducing the response speed.

Also, in the liquid crystal display device 300 according to the present embodiment, since each common electrode 309 close to the counter substrate can be formed in a linear strip shape extending in the horizontal direction in the figure, when compared to the configuration of the liquid crystal display device 100 according to the first embodiment in which each common electrode 9 has an edge crooked in a rectangular waveform in plan view, positioning accuracy of the dot areas D1 to D3 in the arraying direction thereof (in the horizontal direction in the figure) is eased. Accordingly, in the liquid crystal display device 300 according to the present embodiment, it is not needed to widely form a non-display area taking positional displacement of each dot area into account, thereby resulting in a high aperture ratio.

Meanwhile, also in the present embodiment, although the liquid crystal display device is of a transmissive type by way of example, when reflective films are formed in the corresponding forming areas of the island-shaped portions 331a to 331c, the liquid crystal display device 300 serves as a reflective type, and when a reflective film is formed only in the forming area of the island-shaped portion 331a, the liquid crystal display device 300 serves as a transflective type.

Figure 6:
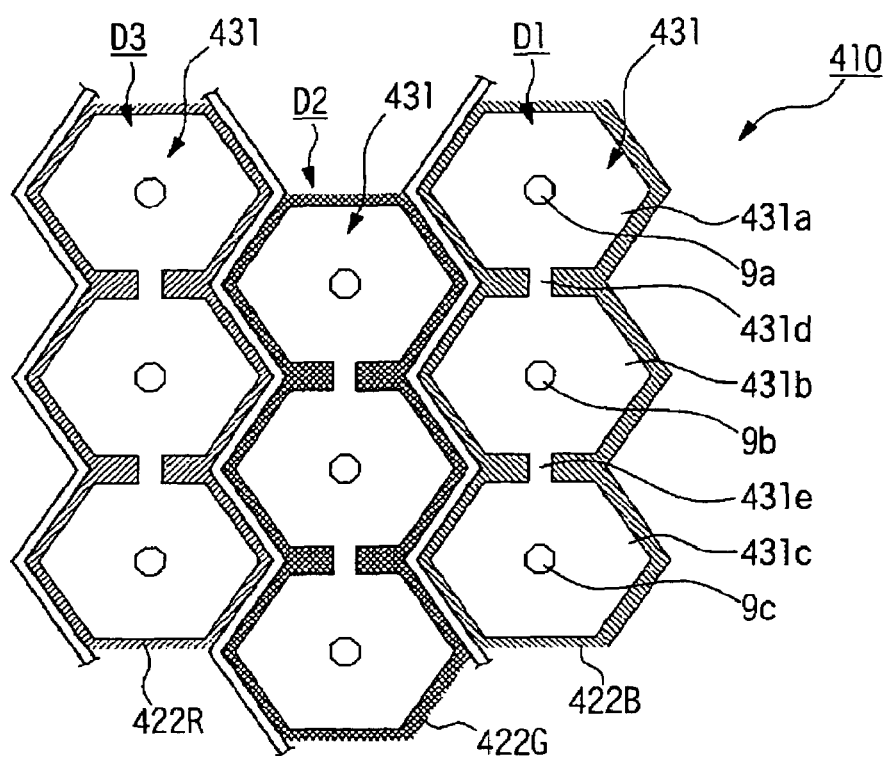
FIG. 6 is a plan view illustrating the configuration of a pixel area of a liquid crystal display device according to a fourth exemplary embodiment.
Figure 7:
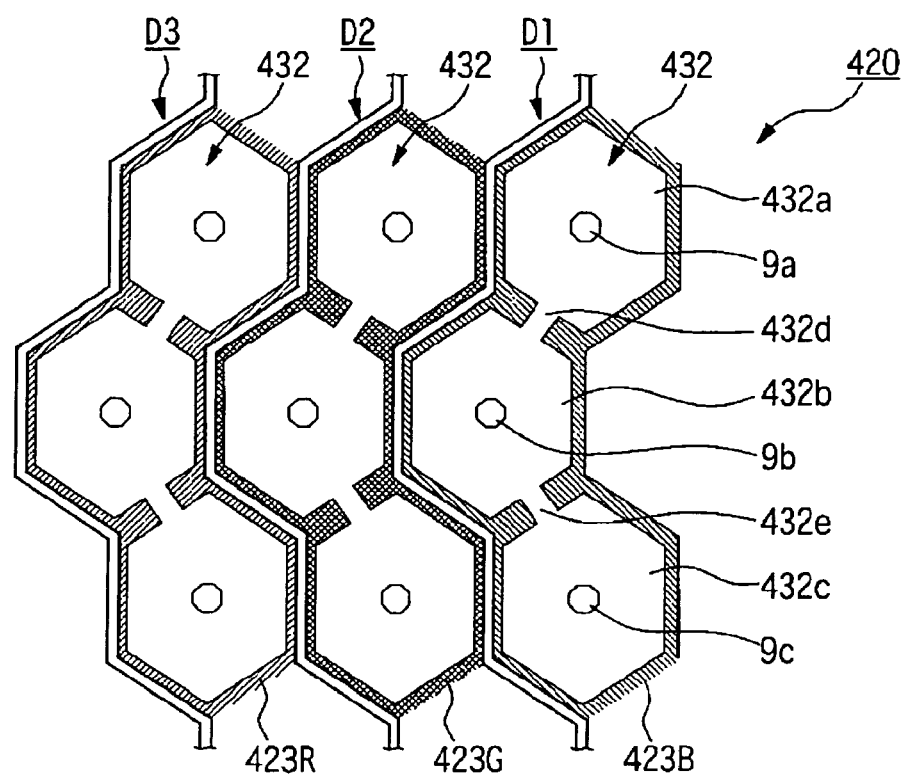
FIG. 7 is a plan view illustrating the configuration of a pixel area of another liquid crystal display device according to the fourth exemplary embodiment.

Next, liquid crystal display device 410 and 420 according to a fourth exemplary embodiment will be described with reference to FIGS. 6 and 7. FIGS. 6 and 7 are plan views illustrating the two-dimensional structures of respective pixel areas of the liquid crystal display devices 410 and 420 according to the present embodiment and correspond to FIG. 3(a) in the first embodiment. The liquid crystal display device 410 according to the present exemplary embodiment shown in FIG. 6 is a homeotropic-mode transmissive liquid crystal display device, including pixel electrodes 431 including island-shaped portions, each having a different two-dimensional shape from that of the pixel electrode 31 in the liquid crystal display device 100 according to the first embodiment. The liquid crystal display device 420 shown in FIG. 7 is a homeotropic-mode, transmissive liquid crystal display device including pixel electrodes 432, each having a different two-dimensional shape from that of the pixel electrode 331 in the liquid crystal display device 300 according to the third embodiment.

Meanwhile, components in FIGS. 6 and 7 denoted by the same reference numbers as those in FIG. 3 or 5 are the same as each other, and their descriptions are omitted.

The pixel area shown in FIG. 6 has the three dot areas D1 to D3 disposed therein, and each dot area has the pixel electrode 431 disposed therein, formed by island-shaped portions 431a to 431c, each having a hexagonal shape in plan view, and by belt-like connecting portions 431d and 431e connecting these island-shaped portions. Also, the dot areas D1 to D3 respectively have color filters 422B, 422G, and 422R disposed therein so as to correspond to the forming areas of the respective pixel electrodes 431.

In the pixel area shown in the figure, the central dot area D2 is displaced downward in the figure (in a direction along the long sides of the dot areas) by half a pitch of the island-shaped portions 431a to 431c relative to the other dot areas D1 and D3. The scan lines 13 are formed, each having a triangular waveform in plan view, extending vertically in the figure along the boundary between adjacent two of the dot areas D1 to D3 (the boundary between adjacent two of the color filters 422R, 422G, and 422B), and connected to one of the island-shaped portions 431a to 431c of each dot area through the corresponding TFD element (not shown). Also, the dielectric projections 9a to 9c corresponding to the respective island-shaped portions 431a to 431c are disposed substantially in the centers of the two-dimensional areas of the same, and, due to an oblique electric field generated in each edge of each of the island-shaped portions 431a to 431c during application of a voltage and also to an alignment control operation of each of the dielectric projections 9a to 9c, a liquid crystal domain in which liquid crystal molecules are aligned in a radial pattern about each of the dielectric projections 9a to 9c as the center thereof is formed in the two-dimensional area of each of the island-shaped portions 431a to 431c.

The pixel area shown in FIG. 7 has the three dot areas D1 to D3 disposed therein, each including the corresponding pixel electrode 432 formed by island-shaped portions 432a to 432c, each having a hexagonal shape in plan view, and also by connecting portions 432d and 432e connecting these island-shaped portions. The dot areas D1 to D3 respectively have color filters 423B, 423G, and 423R disposed therein so as to correspond to the forming areas of the respective pixel electrodes 432. In the pixel area shown in the figure, the central island-shaped portion 432b of each of the dot areas D1 to D3 is displaced leftward in the figure (in the direction along the short sides of the dot areas) by half a pitch of the island-shaped portions relative to the other island-shaped portions 432a and 432c. The scan lines 13 are formed, each extending vertically in the figure, having a step shape along the boundary between adjacent two of the dot areas D1 to D3, and connected to one of the island-shaped portion 432a to 432c of each dot area through the corresponding TFD element (not shown).

The dielectric projections 9a and 9c corresponding to the respective island-shaped portions 432a to 432c are disposed substantially in the centers of the two-dimensional areas of the same, and a liquid crystal domain in which liquid crystal molecules are aligned in a radial pattern about each of the dielectric projections 9a and 9c as the center thereof is formed in the two-dimensional area of each of the island-shaped portions 432a to 432c.

The feature of the liquid crystal display device 410 or 420 respectively shown in FIGS. 6 and 7 is that the island-shaped portions 431a to 431c of the liquid crystal display device 410 or the island-shaped portions 432a to 432c of the liquid crystal display device 420 are respectively arrayed in a honeycomb pattern while each island-shaped portion has a hexagonal two-dimensional shape. With such a structure, the two-dimensional filling factor of the island-shaped portions in the display area is more increased than those in the liquid crystal display devices 100 and 300 in which each island-shaped portion has an octagonal two-dimensional shape in plan view, thereby increasing an aperture ratio of each of the dot areas D1 to D3 and achieving bright display. To be specific, the aperture ratio of each dot area is increased by about 5% when compared to that in the case where island-shaped portions, each having an octagonal shape in plan view, are disposed in the dot areas disposed at the same dot pitch as each other (for example, in the first or second exemplary embodiment).

Concerning alignment control of liquid crystal in each of the liquid crystal display devices 410 and 420 according to the present embodiment, since each island-shaped portion has a hexagonal two-dimensional shape and hence, each corner of the hexagon forms a relatively small inner angle, poor alignment is likely to occur at such a corner. In order to prevent such poor alignment, each of the island-shaped portions 431a to 431c or the island-shaped portions 432a to 432c preferably has a dodecagonal two-dimensional shape whose angular corners are chamfered or a shape having curved corners formed by rounding-off.

Figure 8:
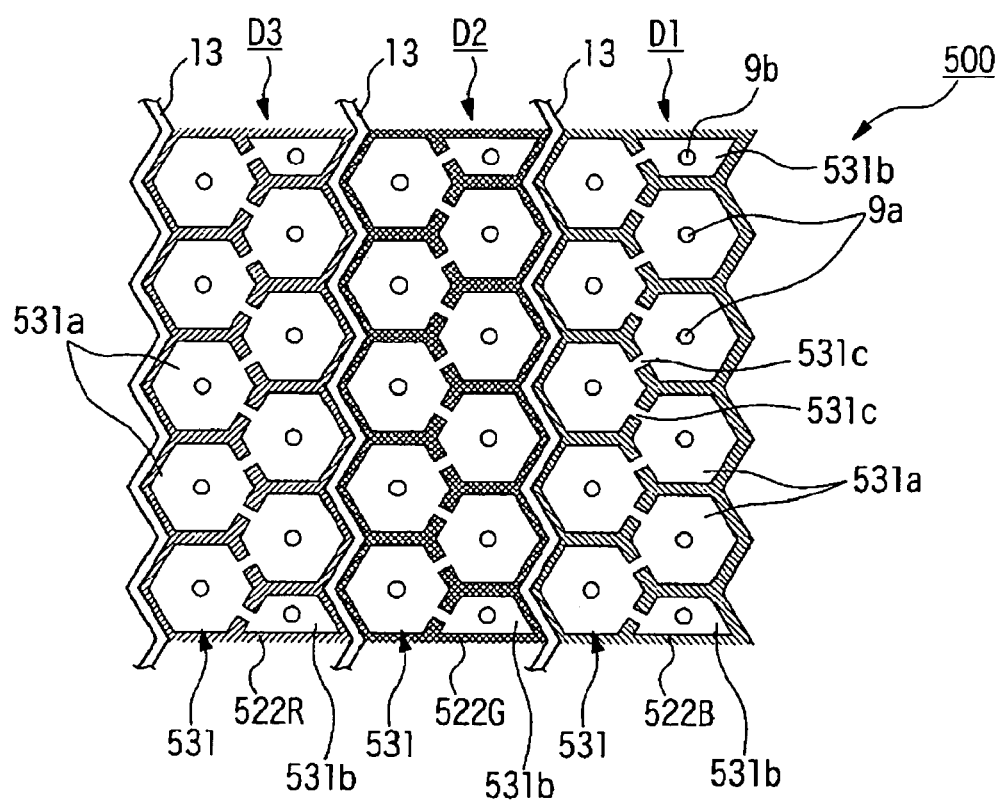
FIG. 8 is a plan view illustrating the configuration of a pixel area of a liquid crystal display device according to a fifth exemplary embodiment.

Next, a liquid crystal display device 500 according to a fifth exemplary embodiment will be described with reference to FIG. 8. FIG. 8 is a plan view illustrating the two-dimensional structure of a pixel area of the liquid crystal display device 500 according to the present exemplary embodiment and corresponds to FIG. 3(a) in the first embodiment. Although a high-definition liquid crystal display device having a structure in which two or three pieces of island-shaped portions are disposed in a single dot area is employed in each of the foregoing first to fourth exemplary embodiments, the liquid crystal display device 500 according to the present embodiment is an example homeotropic-mode, transmissive liquid crystal display device having a structure in which a large number of island-shaped portions are disposed in a single dot area and having a relatively large pixel area. Components in FIG. 8 denoted by the same reference numbers as those in FIG. 3 are the same as those in FIG. 3, and their descriptions are omitted.

The pixel area shown in FIG. 8 has the three dot areas D1 to D3 disposed therein. Each dot area has pixel electrodes 531 disposed therein, each formed by nine island-shaped portions 531a, each having a hexagonal shape in plan view, by two island-shaped portions 531b, each having a trapezoidal shape in plan view, and by a plurality of belt-like connecting portions 531c connecting these island-shaped portions. Also, the dot areas D1 to D3 respectively have color filters 522B, 522G, and 522R disposed therein so as to correspond to the forming areas of the respective pixel electrodes 531.

In the dot area D1 shown in the figure, the island-shaped portions 531a, each having a hexagonal shape in plan view, are arrayed in a two-rows, honeycomb pattern, the two island-shaped portions 531b, each having a trapezoidal shape in plan view, are disposed in the upper and lower ends of the dot area D1 in the figure, and adjacent two of the island-shaped portions are connected to each other by the corresponding connecting portions 531c, thus causing the corresponding pixel electrode 531 to have an approximately rectangular shape.

The scan lines 13 are formed, each having a triangular waveform in plan view, extending vertically in the figure along the boundary between adjacent two of the dot areas D1 to D3 (the boundary between two of the color filters 522R, 522G, 522B), and connected to the island-shaped portion 531a (or 531b) of each dot area through the corresponding TFD element (not shown).

Each island-shaped portions 531a has the corresponding dielectric projection 9a disposed substantially in the center of the two-dimensional area thereof, and also, each island-shaped portion 531b has the corresponding dielectric projection 9b disposed substantially in the center of the two-dimensional area thereof. Thus, due to an oblique electric field generated in each edge of each of the island-shaped portions 531a and 531b during application of a voltage and also to an alignment control operation of each of the dielectric projections 9a and 9b, a liquid crystal domain in which liquid crystal molecules are aligned substantially in a radial pattern in plan view about each of the dielectric projections 9a and 9b as the center thereof is formed in the two-dimensional area of each of the island-shaped portions 531a and 531b.

In a liquid crystal display device including a pixel electrode formed by disposing island-shaped portions, when the island-shaped portions are arrayed in a single row, each island-shaped portion can be too large, and, when the island-shaped portions are arrayed in two rows, each island-shaped portion can be too small. For example, in a liquid crystal display device providing a dot size of 70 μm by 200 μm (corresponding to 120 ppi), when island-shaped portions are arrayed in a square grid pattern on the basis of a known art, and when arrayed in three rows and one column, each island-shaped portion has a size of about 62 μm, which lies out of the optimal range shown in FIG. 9(b), thus causing its response speed to decrease accordingly, and when arrayed in six rows and two columns by reducing the size of each island-shaped portion small, the island-shaped portion has a size of about 29 μm, which lies out of the optimal range, thus leading to a reduced transmittance.

As a remedy, as shown in the liquid crystal display device 500 according to the present embodiment shown in FIG. 8, by forming each of the island-shaped portions 531a so as to have a hexagonal shape in plan view and also by arraying them in a honeycomb pattern, with the above-mentioned dot size, the size of each island-shaped portion 531a can be maximized up to 37 μm by 29 μm, and thus the island-shaped portions 531a and 531b can be more densely disposed, thereby achieving a liquid crystal display device having excellent features of bright display and fast response. In the liquid crystal display device 500 according to the present embodiment, since the island-shaped portions 531a, each having a hexagonal shape in plan view, are arrayed, a high aperture ratio and bright display are achieved even when compared to a liquid crystal display device in which island-shaped portions, each having an octagonal shape in plan view, are arrayed.

Figure 10:
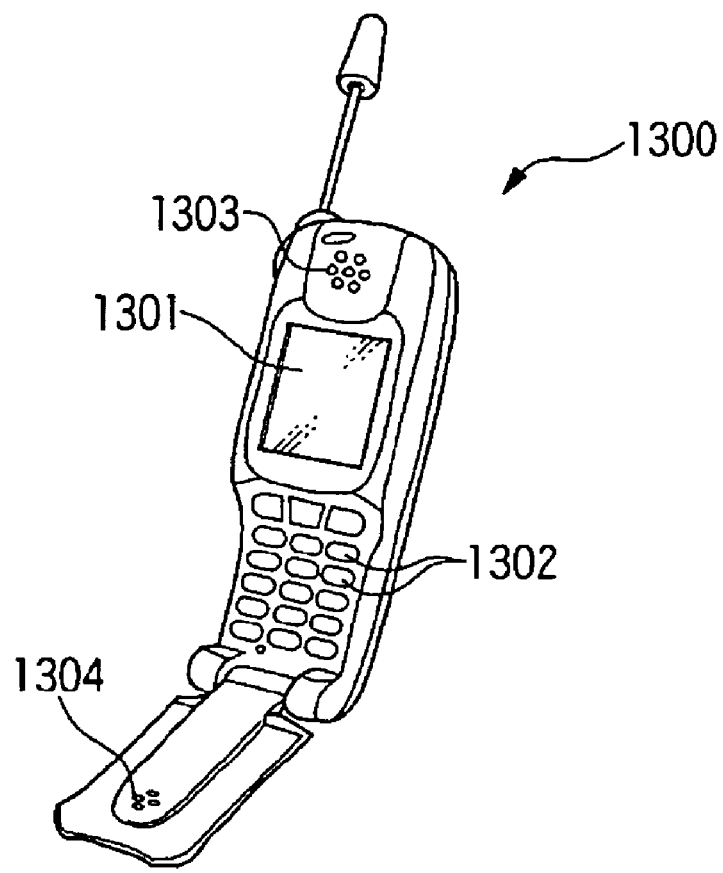
FIG. 10 is a perspective view of an example electronic apparatus according to the invention.

FIG. 10 is a perspective view of an exemplary electronic apparatus according to the present invention. A portable phone 1300 shown in the figure includes the display device according to the present invention as a compact display unit 1301 and is formed by a plurality of operation buttons 1302, an earpiece 1303, and a mouthpiece 1304.

The display device according to each embodiment is suitable for use as image-displaying means not only in the foregoing portable phone but also in an electronic book, a personal computer, a digital still camera, a liquid crystal TV set, a view-finder video-tape recorder or a monitor direct-viewing video-tape recorder, a car navigation apparatus, a pager, electronic notebook, a calculator, a word processor, a workstation, a video phone, a POS terminal, an apparatus including a touch panel, or the like, and with any one of the electronic apparatuses, bright and high contrast transmissive, reflective display, or transflective display having a feature of wide-viewing angle is achieved.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A liquid crystal display device, comprising:
a pair of substrates having a display area including dot areas;
an electrode in each of the dot areas, each of the electrodes including at least two island-shaped portions aligned in a first direction;
a connecting portion electrically connecting adjacent two island-shaped portions in each of the dot areas;
a liquid crystal layer sandwiched between the pair of substrates, including liquid crystal with homeotropic orientation; and
the island-shaped portions being arrayed in the display area substantially in a honeycomb pattern in a plan view, the adjacent island-shaped portions being shifted out of alignment in the first direction in which the island-shaped portions of each dot area are aligned so that the center of an island-shaped portion in one dot area is aligned with the connecting portion of an adjacent dot area in a second direction that intersects the first direction.

2. The liquid crystal display device according to claim 1, further comprising a line serving as a scan line, the line having a snaking shape that substantially follows edges of the island-shaped portions.

3. The liquid crystal display device according to claim 1, each dot including a reflective display area and a transmissive display area, an insulating film being provided that causes the liquid crystal layer to be thinner in the reflective display area than in the transmissive display area, the insulating film including a sloping section near an edge section thereof, the connecting portion overlapping the sloping section in plan view.

4. The liquid crystal display according to claim 1, each dot including a reflective display area and a transmissive display area, an insulating film being provided that causes the liquid crystal layer to be thinner in the reflective display area than in the transmissive display area, the insulating film including a sloping section near an edge section thereof, a line being provided to serve as a scan line, the line having a snaking shape that substantially follows edges of the island-shaped portions and that overlaps with the sloping section of the insulation film in plan view.

5. A liquid crystal display device, comprising:
a pair of substrates having a display area including dot areas;

an electrode disposed in each of the dot areas, each of the electrodes including at least two island-shaped portions aligned in a first direction;

a connecting portion electrically connecting adjacent two island-shaped portions in the each of the dot areas;

a liquid crystal layer sandwiched between the pair of substrates, including liquid crystal with homeotropic orientation; and adjacent island-shaped portions disposed in adjacent dot areas of the dot areas and adjacent to each other;

the island-shaped portions being linearly arrayed in each of the dot areas, and the adjacent island-shaped portions being shifted out of alignment in the first direction in which the island-shaped portions are linearly arrayed, so that the center of an island-shaped portion in one dot area is aligned with the connecting portion of an adjacent dot area in a second direction that intersects the first direction.

6. The liquid crystal display device according to claim 5, further comprising a line serving as a scan line, the line having a snaking shape that substantially follows edges of the island-shaped portions.

7. The liquid crystal display device according to claim 5, each dot including a reflective display area and a transmissive display area, an insulating film being provided that causes the liquid crystal layer to be thinner in the reflective display area than in the transmissive display area, the insulating film including a sloping section near an edge section thereof, the connecting portion overlapping the sloping section in plan view.

8. The liquid crystal display device according to claim 5, each dot including a reflective display area and a transmissive display area, an insulating film being provided that causes the liquid crystal layer to be thinner in the reflective display area than in the transmissive display area, the insulating film including a sloping section near an edge section thereof, a line being provided to serve as a scan line, the line having a snaking shape that substantially follows edges of the island-shaped portions and that overlaps with the sloping section of the insulation film in plan view.

* * * * *